United States Patent [19]

Williams

[11] Patent Number: 4,530,951

[45] Date of Patent: Jul. 23, 1985

[54] FLAME RETARDANT POLYAMIDE COMPOSITIONS

[75] Inventor: Ian G. Williams, Cleveland, England

[73] Assignee: Imperial Chemical Industries PLC, London, England

[21] Appl. No.: 584,910

[22] Filed: Feb. 29, 1984

[30] Foreign Application Priority Data

Mar. 17, 1983 [GB] United Kingdom ............... 8307409

[51] Int. Cl.³ .............................. C08K 5/03; C08K 3/22
[52] U.S. Cl. .................................. 524/101; 524/100; 524/411; 524/467
[58] Field of Search .................... 524/100, 101, 411

[56] References Cited

U.S. PATENT DOCUMENTS 4,268,432 5/1981 Maslen et al. ................ 524/411
4,360,616 11/1982 Pagilagan ..................... 524/100

FOREIGN PATENT DOCUMENTS 1572497 7/1980 United Kingdom .

Primary Examiner—Lewis T. Jacobs
Attorney, Agent, or Firm—Cushman, Darby & Cushman

[57] ABSTRACT

A glass-reinforced, fire-retardant, arc-track resistant composition characterized in that it contains:
(a) at least 35% by weight of a fibre-forming polyamide,
(b) 15 to 25% by weight of glass fibres,
(c) 16–30% by weight of melamine cyanurate,
(d) 2 to 7% by weight of the condensation product of 2 moles of chlorocyclopentadiene and 1 mole of 1,5-cyclooctadiene, and an amount of
(e) a fire retardant synergist selected from antimony oxide, iron oxide and stannic oxide, to give a weight ratio of (d) to (e) between 1:1 and 5:1, and wherein the constituents of the composition total 100%.

5 Claims, No Drawings

FLAME RETARDANT POLYAMIDE COMPOSITIONS

This invention relates to glass-reinforced polyamide compositions having a good balance of fire retardancy and resistance to carbonisation when subjected to excessive leakage of electrical current.

British Pat. No. 1,572,497 discloses glass-reinforced polyamide compositions having a good level of both fire retardancy and arc tracking resistance. These compositions contain from 5 to 30% by weight of a halogenated fire retardant. For some uses the corrosivity of the fumes generated on burning the composition is a very important consideration. In these applications compositions should be used which contain as little as possible of halogen-containing constituents. European patent application No. 55893 discloses glass-reinforced flame-retardant polyamide compositions in which a mixture of halogenated compounds and melamine derivatives are used in order to reduce the concentration of halogenated compound present. The compositions disclosed contain:

(a) from 40 to 65% by weight of a polyamide, (b) 16 to 35% by weight of melamine, melam, melamine cyanurate or a melamine derivative which has the formula:

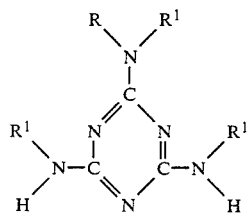

where R and $R^1$ may be the same or different and hydrogen, lower alkyl, phenyl, tolyl or halophenyl, (c) 1 to 7% by weight of a chlorinated compound obtained from condensation of two moles of perchlorocyclopentadiene and one mole or 1,5-cyclooctadiene or a brominated polystyrene, (d) 1 to 4.9% by weight of zinc borate or zinc oxide, and (e) 5 to 30% by weight of glass fibres.

It has now been found that a good balance of fire retardancy and arc tracking resistance can be achieved without the use of zinc borate or zinc oxide.

Accordingly there is provided a glass-reinforced, fire-retardant, arc-track resistant composition characterised in that it contains:

(a) at least 35% by weight of a fibre-forming polyamide, (b) 15 to 25% by weight, preferably from 17.5 to 22.5%, by weight, of glass fibres, (c) 16–30%, preferably 17.5 to 27.5% by weight of melamine cyanurate, (d) 2 to 7%, preferably 2.5 to 5.0% by weight of the condensation product of 2 moles of chlorocyclopentadiene and 1 mole of 1,5-cyclooctadiene, and an amount of (e) a fire retardant synergist selected from antimony oxide, iron oxide and stannic oxide, to give a weight ratio of (d) to (e) between 1:1 and 5:1, preferably between 2:1 and 4:1, and wherein the constituents of the composition total 100%.

Although European patent application No. 55893 recognises that antimony oxide may be included as a synergist in addition to the zinc borate or zinc oxide it does not recognise that antimony oxide can be used as the sole synergist nor that it can be used effectively at a low concentration.

The fire-retardant characteristics of the composition of the invention are conveniently determined using the Underwriters Laboratories Test Standard UL94. Using the Vertical Burning Test of this Standard the compositions of the invention should have a rating of 94 Vl or better when tested on samples having a thickness of 1.6 mm both when conditioned at a relative humidity of 50% for 48 hours or at 70° C. for one week.

The tracking resistance of the compositions is conveniently determined by the method set out in the method of DIN 53480/1972 (KC Method). The compositions when tested according to this method should have a comparative tracking resistance of at least 300, preferably at least 375, and more desirably at least 450, that is having a tracking resistance in the specified test of at least 300 volts and preferably at least 375 volts and more desirably at least 450 volts.

The polyamides used in the invention are polyamides having a melting point of at least 220° C. and containing a major proportion of repeating units derived from hexamethylene adipamide, hexamethylene sebacamide or caprolactam. The most suitable polymers are homopolymers of nylon 66 and nylon 6 and copolymers of these materials containing not more than 50% by weight of units other than nylon 66 or nylon 6. These other units may be, for example, of nylon 6.9 or 6.10. The preferred materials are the homopolymers of nylon 66 and nylon 6 and copolymers of nylon 66 with nylon 6.

The polyamides preferably have a number average molecular weight of at least 3000.

The condensation product of chlorocyclopentadiene and cycloctadiene has the formula:

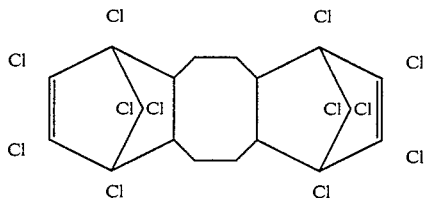

hereinafter referred to by the formula $C_{18}H_{12}Cl_{12}$.

The compositions of the invention are conveniently prepared by compounding the ingredients together with molten polyamide until a uniform blend is obtained. Screw extruders are commonly used for this purpose.

The behaviour of the composition of the invention is highly specific and is not predictable from the disclosure of European patent application No. 55893. For example, if the compound of formula $C_{18}H_{12}Cl_{12}$ in the present invention is replaced by brominated polystyrene (one of the alternative halogen compounds in EP 55893) then the resulting material has inadequate fire retardancy. Similarly, a comparable composition within the claims of EP 55893 where zinc oxide is used instead of the antimony oxide of the present composition has inadequate fire retardancy.

In addition to the polyamide and the specified ingredients the compositions of the invention may contain any of the auxiliary materials which are known for use in polyamide compositions. These include heat and light stabilisers, pigments, lubricants and mould release agents.

The compositions of the invention are suitable for moulding general purpose electrical components or other components where fire retardancy is important.

The invention is further illustrated by reference to the following examples.

EXAMPLE 1

The constituents of the compositions listed in Table 1 were melt compounded with a 90:10 nylon 66:nylon 6 copolymer in a 50.8 mm single screw extruder which by pass venting after dry blending the constituents for each composition prior to feeding to the extruder. The compounding was carried out at a temperature of 250° C. to 270° C. and the products were extruded as a lace, quenched in a water bath and cut into granules. After thorough drying the pellets were injection moulded into standard test pieces for determination of fire retardancy, electrical and mechanical property measurements.

In Table 1 all concentrations of the constituents are expressed as percent by weight of the total composition.

These compositions were inferior in burning performance to compositions according to the invention.

TABLE 2

| Composition | Glass fibre | Melamine cyanurate | $C_{18}H_{12}Cl_{12}$ | Synergist | Fire retardancy performance (sec) 50% RH/48 hours max | mean | 70° C./1 week max | mean | UL94 rating |
|---|---|---|---|---|---|---|---|---|---|
| A | 20 | 25 | — | — | — | — | 8 BD[1] | 1.9 | V2 |
| B | 20 | 25 | 3 | 1.5 ZnO | — | — | >60 BD | 18.0 | V2 fail |
| C | 20 | 25 | 2 | 0.6 $Sb_2O_3$ | 3 BD | 0.3 | 4 BD | 0.7 | V2 |
| D | 10 | 25 | 3 | 1 $Sb_2O_3$ | 9 BD | 3.0 | — | — | V2 |
| E | 20 | 25 | 4[2] | 1 $Sb_2O_3$ | — | — | 15 BD | 2.9 | V2 |
| F | 20 | 15 | 3 | 1 $Sb_2O_3$ | — | — | 5 BD | 1.6 | V2 |
| G | 20 | — | 8 | 2 $Sb_2O_3$ 20 zinc borate[3] | 17 | 9.0 | 18 | 9.3 | V2 |

[1]BD means Burning Drips.
[2]This composition contained 4% by weight of brominated polystyrene ('Pyrochek' 68PK) in place of the $C_{18}H_{12}Cl_{12}$.
[3]The zinc borate used had the formula $2ZnO.3B_2O_3.3.5H_2O$.

I claim:

1. A glass-reinforced, fire retardant, arc-track resistant composition characterised in that it contains:
  (a) at least 35% by weight of a fibre-forming polyamide,
  (b) 15 to 25% by weight of glass fibres,
  (c) 16–30% by weight of melamine cyanurate,
  (d) 2 to 7%, by weight of the condensation product of 2 moles of chlorocyclopentadiene and 1 mole of cyclooctadiene, and an amount of
  (e) antimony oxide, being the sole fire retardant synergist present,
to give a weight ratio of (d) to (e) between 1:1 and 5:1 and wherein the constituents of the composition total 100%.

2. A polyamide composition according to claim 1 wherein the concentration of melamine cyanurate is from 17.5 to 27.5% by weight of the composition.

3. A polyamide composition according to either of claims 1 and 2 wherein the concentration of the condensation product (d) is between 2.5 to 5.0% by weight of the composition.

4. A polyamide composition according to any one of claims 1 to 2 wherein the weight ratio of the condensation product (d) to the synergist (e) is between 2:1 and 4:1.

COMPARATIVE EXAMPLE

The compositions listed in Table 2 were prepared according to the method of Example 1.

5. A composition according to any one of the claims 1 and 2 wherein the concentration of glass fibre is between 17.5% and 22.5% by weight of the composition.

TABLE 1

| Composition | Glass fibre | Melamine cyanurate | $C_{18}H_{12}Cl_{12}$ | $Sb_2O_3$ | Fire retardancy performance (sec) 50% RH/48 hours max | mean | 70° C./1 week max | mean | UL94 rating | Kc (volts) | Tensile strength $MN/m^2$ | Impact strength (kJ) UNIS | IS ¼ | Limiting oxygen index |
|---|---|---|---|---|---|---|---|---|---|---|---|---|---|---|
| 1 | 20 | 25 | 3 | 1 | 2 | 0.3 | 0 | 0 | V0 | 425 | 123 | 38 | 8.5 | 27.0 |
| 2 | 17.5 | 20 | 3 | 1 | 0 | 0 | 7 | 0.9 | V0 | — | 123 | 34 | 6.1 | — |
| 3 | 20 | 22.5 | 3 | 1 | 0 | 0 | 1 | 0.2 | V0 | — | 125 | 40 | 6.4 | — |
| 4 | 20 | 25 | 2.5 | 0.8 | 0 | 0 | 1 | 0.2 | V0 | 475 | 123 | 40 | 6.1 | — |
| 5 | 20 | 25 | 3.5 | 1.2 | 0 | 0 | 1 | 0.2 | V0 | 375 | 124 | 36 | 6.4 | — |
| 6 | 20 | 22.5 | 2.5 | 0.8 | 5 | 0.5 | 8 | 0.9 | V0 | — | 128 | 42 | 6.6 | — |

* * * * *